United States Patent Office

2,856,420
Patented Oct. 14, 1958

2,856,420

PERFLUORO- AND PERFLUOROCHLORO-CARBOXYLIC ACID ESTERS OF AMINO ALCOHOLS

George H. Crawford, Jr., Staten Island, N. Y., assignor, by mesne assignments, to Minnesota Mining and Manufacturing Company, St. Paul, Minn., a corporation of Delaware No Drawing. Application December 15, 1955
Serial No. 553,393

7 Claims. (Cl. 260—487)

This invention relates to a novel and useful composition of matter and to a method for the preparation thereof. In one aspect this invention relates to novel fluorine and nitrogen-containing organic compounds which are particularly useful as modifiers for halogen-containing high polymers. In another aspect this invention relates to a method of preparation of novel and useful fluorine and nitrogen-containing organic compounds.

In many applications in which industrial users employ high molecular halogen-containing polymers, it is often advantageous that the properties of the polymers be somewhat modified. For example, it is often desirable to modify the properties of polymers of trifluorochloroethylene including both elastomers and thermoplastics, in order to obtain improvement in their low temperature flexibility and rubbery characteristics without detrimental effect on the desirable properties of these polymers such as their chemical and thermal stability and resistance to aromatic and aliphatic hydrocarbon oils and fuels. Many of the modifiers including plasticizers and curing agents which are presently employed to modify the above-mentioned properties of halogen-substituted polymers, however, are relatively volatile, have a tendency to bleed during fabrication of the polymer, are deleteriously affected at the temperatures used to mold the polymer and/or they tend to lower the degree of chemical inertness and heat stability of the polymer.

It is an object of this invention to provide a novel composition of matter which is particularly useful as a modifier for halogen-containing polymers.

Another object is to provide a novel organic compound which is compatible with fluorine and chlorine-containing polymers such as polymers of trifluorochloroethylene, and which improves the low temperature flexibility and mechanical properties of such polymers without detrimental effect on their desirable properties.

A further object is to provide a novel polymeric composition of improved properties comprising a copolymer of trifluorochlorethylene and vinylidene properties.

A further object is to provide a method for the manufacture of a novel organic compound which is useful as a modifier for halogen-substituted high polymers including both elastomers and thermoplastics.

Various other objects and advantages of the present invention will become apparent to those skilled in the art from the accompanying description and disclosure.

The above objects are accomplished by the novel process which comprises reacting a fluorine-containing acyl compound such as the carboxylic acids, acid halides and acid anhydrides with an organic amine having at least one tertiary nitrogen atom bonded to at least one hydroxyalkyl group. The compounds thereby produced are novel fluorine-containing esters of said organic amine. Of the aforesaid fluorine-containing acyl compounds which are employed as a starting material in accordance with this invention, the perfluoro and perfluorochloro compounds are preferred. Of the aforesaid organic amines which are employed, the diamines in which both nitrogen atoms are tertiary and having at least two hydroxyalkyl groups bonded to nitrogen are preferred. The process of the present invention is generally carried out at a temperature between about room temperature (20° C.) and about 300° C., although lower temperatures, and temperatures just below the decomposition temperature of the reactants or reaction products, may be employed without departing from the scope of this invention. The novel halogen-and nitrogen-containing esters of the present invention find particular utility and value as modifiers for halogen-substituted thermoplastic and elastomeric polymers such as the high polymers of trifluorochloroethylene including both homopolymers and copolymers.

As indicated above, one starting material of the present invention is a fluorine-containing carboxylic acid or derivative such as the acid anhydrides and acid halides, the acid anhydrides being the preferred type of derivative. The acids which are employed are fluorine-containing saturated and unsaturated aliphatic acids including both the acyclic and alicyclic acids, and aromatic acids. Of these, the preferred type is the saturated acyclic acids which are referred to herein as the alkanoic acids. It is to be understood that the definitions of the sub-classes of acids used herein also apply to the acid halides and anhydrides.

The acyl-containing starting material of the present invention is represented by the following general formula:

wherein R is a fluorine-containing organic radical having from 1 to about 19 carbon atoms; and wherein Y is either a hydroxyl group (—OH) or thiol group (—SH) as in the free acids; a halogen atom (X) as in the acid halides; or a carboxylate group

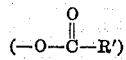

such as in the acid anhydrides, the R and R' radicals preferably being the same. The

group shown in the above formula is referred to herein as the acyl group, and is the acyl portion of the novel carboxylate esters of the organic amines produced in accordance with this invention. The acyl group contains from 2 to about 20 carbon atoms and preferably contains not more than 12 carbon atoms per radical. The preferred halogen-substituted acids or derivatives are those which are at least half fluorinated, i. e., in which at least half of the hydrogen atoms of the acyl group are substituted with fluorine substituents and in which any other substituents are preferably the normally gaseous halogens, that is, fluorine or chlorine. The preferred fluorine and chlorine-containing acyl compounds are those having at least two fluorine substituents for every chlorine substituent.

One class of the particularly preferred fluorine-containing acyl compound are the perfluorochloroalkanoic acids and derivatives containing at least two fluorine atoms for every chlorine atom, and especially those having the recurring unit, —CF$_2$—CFCl—, represented by the following general formula:

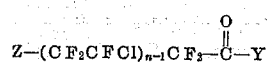

wherein Z is selected from the group consisting of chlorine, fluorine, bromine, and perhalomethyl radicals having a total atomic weight not in excess of 146.5; $n$ is an integer from 2 to 10; and Y is as above-defined. The free acids are obtained by hydrolysis of the products of trifluorochloroethylene telomerized with a bromohalomethane such as, for example, bromotrichloromethane, or with a sulfuryl halide such as, for example, sulfuryl chloride. These telomers are represented by the following general formulas; respectively:

$$M(CF_2CFCl)_n-Br$$
$$Y_1(CF_2CFCl)_n-Y_2$$

wherein M is a perhalomethyl radical having a total atomic weight not higher than 146.5; $n$ is an integer from 2 to 10; $Y_1$ is a halogen selected from the group consisting of fluorine, chlorine, and bromine; and $Y_2$ is a halogen selected from the group consisting of bromine and chlorine. The hydrolysis of such telomer products is carried out in fuming sulfuric acid at a temperature between about 140° C. and about 300° C. This hydrolysis also leads to the production of the perfluorochloroalkanoic di-acids which also are useful as starting materials in accordance with this invention.

The perfluorochloroalkanoic acids set-forth above are converted to their corresponding acid halide derivatives by reaction of the acids with a halogenating agent such as phosphorus trichloride, phosphorus pentachloride, phosphorus tribromide, thionyl bromide, and similar fluorinating and iodinating agents. The acid fluorides, bromides and iodides also may be prepared by reacting the acid chloride with hydrogen fluoride, hydrogen bromide, or hydrogen iodide. These reactions are usually conducted at a temperature between about 20° C. and about 100° C., and preferably between about 30° C. and about 60° C. The perfluorochloroalkanoic acids are converted to their acid anhydrides by preparing a solution of the acid in a fluorocarbon acid anhydride such as perfluorobutyric anhydride, and then refluxing the reaction mixture over phosphorus pentoxide.

Typical examples of the aforesaid particularly preferred perfluorochloroalkanoic acids and derivatives employed in accordance with this invention are the mono acids such as 3,4-dichloroperfluorobutyric acid, 3,5,6-trichlorooctafluorohexanoic acid, 3,5,7,8-tetrachloroundecafluorooctanoic acid, and the corresponding acid halides and acid anhydrides derived from these acids as above-described. Of the acid halides which are employed, the acid chlorides and bromides are preferred.

A second class of particularly preferred organic acyl compounds used as a starting material in accordance with this invention are the perfluoroalkanoic acids and derivatives. Such acids are prepared by hydrolysis of the corresponding acid fluorides. The acid fluorides in turn are prepared by electrolyzing a solution of anhydrous hydrogen fluoride containing a dissolved hydrocarbon carboxylic acid. The perfluorocarboxylic acid chlorides and bromides are derived from the acids by direct treatment of the acid with phosphorus pentachloride or tribromide, respectively. The acid iodides are prepared from the acid chlorides and acid bromides by replacement of the chlorine or bromine by iodine employing calcium iodide. The perfluoro acid anhydrides are readily prepared by interacting the acid chloride and the sodium salt of the acid or by reacting the acid with phosphorus pentoxide. Further details relating to the preparation of the perfluoroalkanoic acids, halides and anhydrides can be found in U. S. Patent 2,567,011.

Typical examples of the aforesaid perfluoroalkanoic acids are those of the homologous series trifluoroacetic acid, perfluoropropionic acid, perfluorobutyric acid . . . perfluorodecanoic acid, etc., and their corresponding acid fluorides, chlorides, bromides, iodides, and anhydrides such as, for example, perfluorohexanoic acid fluoride, n-perfluorobutyryl chloride, n-perfluorobutyryl bromide, and n-perfluorobutyric anhydride.

Also included within the scope of the present invention as a starting material are the polyfluoro and polyfluorochloro acids disclosed in U. S. Patents 2,559,752 and 2,559,629, respectively; perfluorohalo dicarboxylic acids such as perfluoroadipic acid, perfluorosebacic acid, 3,5,7-trichlorononafluorosuberate and their corresponding acid halides and anhydrides; and fluorine-containing aromatic acids such as 2-trifluoromethyl benzoic acid.

As previously mentioned, the compound which is interacted with the acyl compounds in accordance with the present invention, is an organic amine having at least one tertiary nitrogen atom bonded to at least one hydroxyalkyl group. The preferred type of this starting material are the alkylene diamines having between about 5 and about 30 carbon atoms per molecule, and in which both nitrogen atoms are tertiary, at least one valence of each nitrogen atom being bonded to a hydroxyalkyl group. The term "tertiary amine," as used hereinafter, is meant to include the organic mono- and poly-amines in which the nitrogen atoms are bonded only to carbon.

The particularly preferred tertiary amines are the N,N,N',N' - tetrakis - (hydroxyalkyl) - alkylene diamines, i. e. the diamines in which the nitrogen atoms are separated by an unsubstituted alkylene radical, e. g.

$$-CH_2-CH_2-$$

and in which the residual two valences of each nitrogen atom are bonded only to a carbon atom of the hydroxyalkyl group. These particularly preferred diamines belong to the homologous series of compounds having the structure $$>N-(CH_2)_n-N<$$

wherein $n$ is an integer from 1 to about 10 and is preferably not more than 6, and wherein each of the two residual valences of each nitrogen atom are bonded to a carbon atom of a hydroxyalkyl group. The hydroxyalkyl group may contain from 1 to 10 carbon atoms and preferably contains not more than 6 carbon atoms, the carbon atoms being arranged in a straight or branched chain. The aforesaid alkylene tertiary diamines having two hydroxyalkyl groups bonded to each nitrogen atom, or a total of 4 hydroxyalkyl groups per molecule, are particularly preferred as a starting material since such alkylene diamines possess a maximum number of hydroxyl groups, thereby enabling a high percentage of fluorine-containing acyl radicals to be incorprated into the novel carboxylate esters of this invention which is highly desirable.

Illustrative of the organic amines used in accordance with this invention are triethanolamine; dimethylamino cyclohexanol; N,N,N',N'-tetrakis-(2-hydroxyethyl)-1,3-propanediamine; N,N,N',N'-tetrakis-(2-hydroxypropyl)-ethylene diamine; 2-hydroxyethyl diethlamine, 2-hydroxypropyl dipropyl amine, and similar compounds.

The preparation of the organic amines used as starting materials in the process of this invention is accomplished by reacting halogen-substituted alcohols with an organic primary or secondary amine in a basic medium. For example, N,N,N',N'-tetrakis-(2-hydroxypropyl)ethylene diamine is prepared by reacting propylene chlorohydrin with ethylene diamine in a basic medium at room temperature or at elevated temperatures.

Although the organic amines containing a primary or secondary nitrogen atom in addition to the tertiary nitrogen atom may be employed, it is preferable to select as the nitrogen-containing starting material an amine in which each of the nitrogen atoms is tertiary. Such tertiary amines are preferred so that the main site of reaction will take place at the hydroxyl group of the amine, thereby leading to the production of the desired carboxylate esters of the amine as the main product of the process. The selectivity of the process of the present invention is thereby kept at a maximum and the isolation and purification of the desired product is facilitated.

The following equation showing the reaction between the acid anhydride of 3,5,7,8-tetrachloroundecafluorooctanoic acid and N,N,N',N'-tetrakis-(2-hydroxyethyl)-1,3-propanediamine is offered as a better understanding of this invention and is not to be construed as unnecessarily limiting thereto.

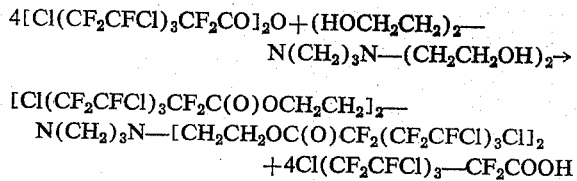

It is to be understood that a mono, bis, tris, or tetra acyl ester and mixtures thereof, can be isolated as the product or products of the process by employing the proper reaction conditions and especially the proper concentration of starting materials. Inasmuch as the preferred reaction products of the present invention are the poly esters, specifically the tetrakis esters, which are typically exemplified by the product of the above equation, at least one mol of acyl compound is employed for every hydroxyalkyl radical of the amine. An excess of the acyl compound is preferably employed not only for the purpose of obtaining a poly esterified product, but also because an excess of acyl compound thereby also serves as a diluent for the reaction and thus facilitates the isolation and purification of the product, the product generally being more viscous than the starting materials.

Generally speaking, the mol ratio of acyl compound to organic amine will be between about 1:1 and about 20:1. The preferred limits depend upon the number of hydroxyalkyl groups in the organic amine. For example, when the amine contains two hydroxyalkyl groups, then the mol ratio of acyl compound to amine is preferably at least 2:1. When the amine is a tetrakis-(hydroxyalkyl)-diamine, the lower limit of the acyl compound to amine is preferably at least 4:1. Upon completion of the reaction, the excess of the acyl compound is conveniently removed from the reaction mixture by distillation.

The process of the present invention is generally conducted at a temperature between about 20° C. and about 300° C. and preferably at a temperature between about 75° C. and about 225° C. The reaction time may vary over relatively wide limits such as between about 15 minutes and about 72 hours. The longer reaction times are generally employed when a fully esterified product is desired as the main product of the reaction and when the acid halides are employed as a starting material.

The perfluorohalo acyl esters of N,N,N',N'-tetrakis hydroxyalkyl alkylene diamines having not more than 6 carbon atoms in the hydroxyalkyl group and not more than 6 carbon atoms in the alkylene group have been found to be the most valuable products of the present invention. Generally speaking, these compounds are liquids which are insoluble in water, aliphatic hydrocarbons and aromatic type solvents such as hexane, cyclohexane, isooctane, benzene, toluene, and xylenes. The fact that these compounds are insoluble in such hydrocarbon and aromatic type solvents, which also are ingredients of common lubricating oils and fuels, makes them particularly valuable as modifiers for polymeric compositions such as the elastomer of trifluorochloroethylene and vinylidene fluoride containing between about 30 and about 50 mol percent of trifluorochloroethylene. The addition of the particularly preferred esters of this invention to such an elastomer does not have any significant effect on decreasing the resistance of the polymer to hydrocarbon oils and fuels. When the aforesaid elastomer is modified with the preferred esters of this invention, it has been found that its low temperature flexibility is markedly improved and that certain of its physical and mechanical properties such as torsional modulus are also improved without any loss of the desirable properties of the elastomer such as impermeability to aliphatic and aromatic hydrocarbon oils and fuels.

Generally speaking, the polymers which are modified to best advantage by the process of this invention are the normally solid high molecular weight resinous thermoplastic and elastomeric polymers obtained by polymerization of a fluorine-containing olefin which olefin is preferably one containing at least 1 fluorine atom for every carbon atom, and not in excess of about 10 carbon atoms per molecule. The polymers which are markedly improved by the novel modifiers of this invention, and especially by the perfluorohalo tetrakis acyl esters, are the polymers of a fluorochloroolefin having not more than about 5 carbon atoms per molecule.

Typical examples of polymers which are modified in accordance with this invention are the homopolymers of vinylidene fluoride, tetrafluoroethylene, trifluorochloroethylene, bromotrifluoroethylene, 1,1 - difluorobutadine, 1,1,2-trifluorobutadiene, and the like. Typical examples of copolymers which are modified in accordance with this invention are trifluorochloroethylene and vinylidene fluoride containing between about 69 and about 80 mol percent of trifluorochloroethylene, trifluorochloroethylene and vinylidene fluoride containing between about 30 and about 50 mol percent of trifluorochloroethylene, trifluorochloroethylene and tetrafluoroethylene, trifluorochloroethylene and hexafluoropropene, and the like.

Admixture of the novel acyl esters of this invention and one of the above-mentioned polymers may be accomplished in a variety of ways. One technique involves admixture of the polymer and modifier in the dry state in finely divided form, that is, in the form of a powder preferably of sufficient fineness to pass through a 40 mesh screen or finer. Convenient tumbling-type mixers such as a barrel and conical mixer may be employed. Admixture also may be effected by a wet blending technique employing a suitable liquid medium. When using a wet blending technique, admixture is effected by placing the ingredients in the desired proportions in an apparatus suitable for wet blending such as a ball mill.

It has been found that the properties of the above-mentioned polymers are modified by as little as 0.1 weight percent of the acyl ester and that the weight ratio of the acyl ester to polymer may vary over relatively wide limits to obtain varying degrees of modification of the polymer. Generally, however, the weight ratio of acyl ester to polymer ranges between about 0.1:1 and about 1:1, preferably between about 0.2:1 and about 0.5:1.

The following examples are offered as a better understanding of this invention and are not to be construed as unnecessarily limiting thereto. The N,N,N',N'-tetrakis-(2-hydroxypropyl)-ethylene diamine used in the following examples is sold commercially by the Wyandotte Chemicals Corporation under the tradename "Quadrol," and has the following structure:

It is a viscous water white liquid which is infinitely soluble in water and has the following reported properties:

SURFACE TENSION

| Concentration: | Dynes per centimeter |
|---|---|
| 0.001% | 71.2 |
| 0.01% | 70.2 |
| 0.1% | 64.1 |
| 1.0% | 55.4 |

VISCOSITY-TEMPERATURE

| Temperature, °C.: | Viscosity (Brookfield), cps. |
|---|---|
| 25 | 44,100 |
| 50 | 3,000 |
| 100 | 44.5 |
| 150 | 9.5 |

VAPOR PRESSURE

| Temperature, ° C.: | Vapor pressure, mm. Hg |
|---|---|
| 190 | 1.0 |
| 200 | 1.7 |
| 210 | 2.5 |

Example 1

This example illustrates the preparation of a perfluoroacyl ester of an N,N,N',N'-tetrakis - (hydroxyalkyl)-alkylene diamine.

To a 2,000 ml. glass reaction flask fitted with a water-cooled reflux condenser and mechanical stirrer, there were added 29.2 grams (0.1 mol) of N,N,N',N'-tetrakis-(2-hydroxypropyl)-ethylene diamine and 188.8 grams (0.46 mol) of perfluorobutyric anhydride. This reaction mixture was heated to reflux temperature which was about 168° C. Refluxing was continued for a period of 8 hours during which time the reaction mixture progressively became more viscous. The condenser was then replaced with a fractional distillation column and the reaction mixture was fractionally distilled at 0.01 mm. mercury pressure. The first fractions which were collected consisted essentially of perfluorobutyric acid and some unreacted perfluorobutyric anhydride. A fraction having a boiling range between 106° and 110° C. at 0.01 mm. mercury pressure was collected and was found to have a density ($D_4^{20}$) of 1.70. This fraction was insoluble in hexane and water but was soluble in acetone, alcohol, and ether. The product was found to contain 46.88 percent fluorine and is identified as N,N,N',N'-tetrakis - (2 - hydroxypropyl perfluorobutyrate)-ethylene diamine having the structure:

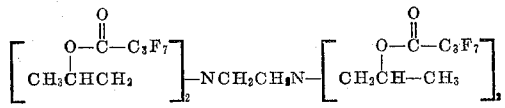

Example 2

This example illustrates the modification of a halogen-containing polymer with the novel acyl esters of the present invention.

(A) The elastomer which was modified by the procedure of this example contains 50 mol percent of combined trifluoro-chloroethylene and 50 mol percent of combined vinylidene fluoride, and was prepared by the following polymerization reaction:

A two gallon autoclave was charged with 15,650 grams of water, 1.6 grams of potassium persulfate, 3.2 grams of sodium metabisulfite and 8.4 grams of ferrous sulfate heptahydrate. Thereafter the autoclave was charged with 8500 grams of trifluorochloroethylene and 8720 grams of vinylidene fluoride. The polymerization reaction was conducted under autogenous conditions of pressure at a temperature of 5° C. for a period of 20 hours after which period unreacted monomers were removed by flash distillation. The polymer latex was coagulated by freezing. The coagulated product was collected, washed with hot water, and dried yielding an elastomer which upon analysis was found to contain about 50 mol percent of combined trifluorochloroethylene and about 50 mol percent of combined vinylidene fluoride.

(B) To 100 grams of the elastomeric copolymer containing about 50 mol percent of trifluorochloroethylene and 50 mol percent of vinylidene fluoride produced in accordance with part (A) of this example, there were added 20 grams of N,N,N',N'-tetrakis-(2-hydroxypropyl perfluorobutyrate)-ethylene diamine prepared as described in Example 1 above. A homogenous mixture was obtained by blending the two ingredients on a rubber mill at room temperature. The novel polymeric composition thereby obtained exhibited improved low temperature flexibility and mechanical properties as compared with the unmodified copolymer.

The low temperature stiffening of the raw modified and unmodified copolymers was determined by means of the Gehman torsional apparatus in accordance with ASTM designation D–1053–49T. The Gehman values for the novel polymeric composition of this example comprising an admixture of the novel acyl ester, N,N,N',N'-tetrakis-(2-hydroxypropyl perfluorobutyrate)-ethylene diamine, and the 50:50 (mol percents) of the trifluorochloroethylene:vinylidene fluoride copolymer were as follows:

$T_2 = -5°$ C.; $T_5 = -10°$ C.;
$T_{10} = -10°$ C.; $T_{100} = -14°$ C.

(The T values are the temperatures at which the composition is 2, 5, 10 and 100 times as stiff as it is at 25° C.)

On the other hand, the Gehman values for the raw unmodified copolymer were considerably higher and were as follows:

$T_2 = 4°$ C.; $T_5 = -1°$ C.; $T_{10} = -3°$ C.; $T_{100} = -7°$ C.

Further, the torsional modulus at 25° C. of the novel polymeric composition of part (B) of this example was found to be 82 pounds per square inch which was significantly lower and therefore better than the torsional modulus of the unmodified copolymer, the latter being 116 p. s. i.

Example 3

This example illustrates the production of a perfluorochloroacyl ester of an N,N,N',N'-tetrakis-(hydroxyalkyl)-alkylene diamine.

(A) The perfluorochlorocarboxylic acid chloride employed in this example was prepared by the following procedure.

Phosphorus pentachloride (2268 grams; 10.9 moles) was added in portions with stirring to 5420 grams (11.3 moles) of 3,5,7,8-tetrachloroundecafluorooctanoic acid, $Cl(CF_2CFCl)_3CF_2COOH$, in a 12 liter three-necked flask, provided with a stirrer, a calcium chloride tube, and a hydrogen chloride trap. The mixture was stirred mechanically for 20 minutes after the final addition of the phosphorus pentachloride. The clear solution was transferred to a 5 liter distilling flask and heated until the pot temperature reached 200° C.; 1405 grams of $POCl_3$ were obtained. An additional 248 grams of forerun were collected at reduced pressure. The acid chloride product was distilled through a 12 inch Vigreux column and was found to boil at 145° C. at 50 mm. mercury pressure. The yield, based on phosphorus pentachloride, was 5147.5 grams (10.3 moles; 94.5 percent).

(B) To a reaction flask fitted with a water-cooled reflux condenser and a mechanical stirrer, there were added 3.0 grams of N,N,N',N' - tetrakis (2 - hydroxypropyl)-ethylene diamine and 20.0 grams of the $C_8$-perfluorochloro acid chloride produced in accordance with part A of this example. The reaction was conducted at reflux temperature which was about 120° C. for a period of 1 hour. The reaction product was a viscous liquid which was insoluble in water and hexane. The reaction product consists of a mixture of mono, bis, tris, and tetrakis perfluorochloro carboxylate esters of the ethylene diamine starting material. The product is separated into its various ester fractions by fractional distillation.

Example 4

This example further illustrates the production of a perfluorochloroacyl ester of an N,N,N',N'-tetrakis-(hydroxyalkyl)-alkylene diamine.

(A) The perfluorochlorocarboxylic acid anhydride employed in this example was prepared as follows:

Two hundred grams of heptafluorobutyric anhydride were added to 87 grams (.25 mole) of $$Cl(CF_2CFCl)_3CF_2COOH$$

A relatively mobile solution resulted. The solution was added slowly to excess phosphorus pentoxide in a 2 liter-3 neck glass flask equipped with a reflux condenser. The reaction mixture was maintained at reflux temperature for a total of 16 hours. The reaction vessel was connected to a 27 inch distillation column. The perfluorobutyric anhydride was distilled off at 108–109° C. The perfluorochlorocarboxylic acid anhydride was then distilled over under vacuum at 78–85° C. at 5 mm. mercury pressure. There were obtained 21 grams of clear, non-viscous liquid; yield, 24% based on $Cl(CF_2CFCL)_3CF_2COOH$.

(B) To a reaction flask fitted with a reflux condenser and a mechanical stirrer were added 1:5 grams (0.005 mole) of N,N,N',N'-tetrakis-(2-hydroxypropyl)-ethylene diamine and 21.0 grams (0.02 mole) of the $C_8$-perfluorochloro acid anhydride produced in accordance with part (A) of this example. The reaction mixture was maintained at a temperature of 150° C. for a period of 20 hours. The water and hexane insoluble ester was water washed free of by-products. The product consists of a mixture of the mono, bis, tris, and tetrakis perfluorochloroacyl esters of the ethylene diamine starting material which mixture is useful in modifying the physical properties of halogen-containing polymers as above-described. The product is separated into its individual ester fractions by fractional distillation.

The fluorine-containing acyl esters of N,N,N',N'-tetrakis-(2-hydroxyethyl)-1,3-propane diamine and of the other amines included within the scope of this invention are similarly prepared using the procedures of the examples set forth above.

As is apparent, the present invention relates to novel and useful fluorine and nitrogen-containing organic compounds having at least one carboxylate group, i. e. an R—C(O)O— group wherein R is as defined hereinabove, and to a method for the production thereof. The preferred compounds are those containing at least one perfluoro or perfluorochloro acyl group $$(R-\overset{O}{\underset{\|}{C}}-)$$

bonded to the oxygen atom of a hydroxyalkyl group of a tertiary alkylene diamine. Various modifications and alterations of these novel compositions and of the process employed to produce such compositions may become apparent to those skilled in the art without departing from the scope of this invention.

I claim:

1. A fluorine-containing carboxylic acid ester, said carboxylic acid selected from the group consisting of perfluoro- and perfluorochloro-carboxylic acids, of an N,N,N',N'-tetrakis-(hydroxyalkyl)-alkylene diamine containing from 6 to 30 carbon atoms in the alkylene group and having not more than 10 carbon atoms per hydroxyalkyl group, said ester containing at least one perfluorohaloacyl group having between 2 and about 20 carbon atoms.

2. A fluorine-containing carboxylic acid ester of an N,N,N',N'-tetrakis-(hydroxyalkyl)-ethylene diamine having not more than 10 carbon atoms per hydroxyalkyl group, said ester containing at least one perfluoroacyl group having between two and about twenty carbon atoms.

3. A fluorine-containing carboxylic acid ester, said carboxylic acid selected from the group consisting of perfluoro- and perfluorochloro-carboxylic acids, of N,N,N',N'-tetrakis-(hydroxypropyl)-ethylene diamine, said ester having at least one perfluorohaloacyl group having between 2 and about 20 carbon atoms.

4. N,N,N',N'-tetrakis-(2 - hydroxypropyl perfluoro-butyrate)-ethylene diamine.

5. A fluorine-containing carboxylic acid ester of N,N,N',N'-tetrakis-(hydroxyalkyl)-ethylene diamine having not more than 10 carbon atoms per hydroxyalkyl group, said ester containing at least one perfluoro-chloroacyl group having between 2 and about 20 carbon atoms.

6. A water insoluble fluorine-containing carboxylic acid ester of N,N,N',N' - tetrakis-(2-hydroxypropyl)-ethylene diamine, said ester containing at least one perfluorochloroacyl radical having between 2 and about 20 carbon atoms and at least two fluorines for every chlorine atom.

7. A fluorine-containing carboxylic acid ester, said carboxylic acid selected from the group consisting of perfluoro- and perfluorochloro-carboxylic acids, of N,N,N', N'-tetrakis-(2-hydroxyethyl)-1,3-propane diamine, said ester containing at least one perfluorohaloacyl group having between 2 and about 20 carbon atoms.

References Cited in the file of this patent

UNITED STATES PATENTS

| 2,290,412 | De Groote et al. | July 21, 1942 |
|---|---|---|
| 2,559,629 | Berry | July 10, 1951 |
| 2,567,011 | Diesslin et al. | Sept. 4, 1951 |
| 2,593,737 | Diesslin et al. | Apr. 22, 1952 |

UNITED STATES PATENT OFFICE
CERTIFICATE OF CORRECTION

Patent No. 2,856,420                                  October 14, 1958

George H. Crawford, Jr.

It is hereby certified that error appears in the printed specification of the above numbered patent requiring correction and that the said Letters Patent should read as corrected below.

Column 1, line 54, for "properties" read -- fluoride --; column 6, line 18, for "1,1 -- difluorobutadine" read -- 1,1-difluorobutadiene --; column 9, line 17, for "Cl($CF_2$CFCL)$_3$$CF_2$COOH" read -- Cl($CF_2$CFCl)$_3$$CF_2$COOH --.

Signed and sealed this 3rd day of February 1959.

(SEAL)

Attest:
KARL H. AXLINE
Attesting Officer

ROBERT C. WATSON
Commissioner of Patents